UNITED STATES PATENT OFFICE.

JOHN STORER CONNELLY, OF NEW CASTLE, PENNSYLVANIA.

IMPROVEMENT IN COMPOUNDS FOR THE PURIFICATION OF GAS.

Specification forming part of Letters Patent No. 218,983, dated August 26, 1879; application filed June 30, 1879.

*To all whom it may concern:*

Be it known that I, JOHN STORER CONNELLY, of New Castle, in the county of Lawrence and State of Pennsylvania, have invented a new and useful Improvement in Compounds for the Purification of Gas; and I do hereby declare the following to be a full, clear, and exact description of the invention.

My invention relates to compounds for purifying coal and other gas; and consists in an admixture of iron sponge, or iron sponge and iron borings or turnings, with sawdust and slaked lime or hydrate of lime, the iron having first been oxidized by means of aqua-ammonia, or its equivalent, and the admixture being finally saturated with lime-water, whereby a cheap and efficient purifier for the removal of sulphur and ammonia from gas is obtained.

Heretofore, in the purification of coal and other gas, various substances have been employed—such as iron, lime, lead-salts, copper-salts, &c.—sometimes separately and sometimes combined; but, so far as I am aware, the various compounds have fallen into disuse, either because of the difficulty and cost of manufacturing, or because they are more or less slow, inefficient, and soon become saturated, so as to require removal from the purifier. So generally have the various compounds failed in usefulness that the old and long-practiced methods of purifying by means of hydrated lime (dry process) and lime-water (wet process) are most commonly followed.

The object of the present invention is to produce a purifying compound which shall be not only easily manufactured, but very efficient.

I will now proceed to describe my invention, so that others skilled in the art to which it appertains may make and use the same.

In carrying out my invention, or making my improved purifying compound, I take iron sponge, such as is made by the process described in the patent of Thos. S. Blair, No. 126,924, dated May 21, 1872, either alone or mixed with iron borings; but I give the preference to the iron sponge for several reasons—first, because the minute subdivision of the metallic iron renders it peculiarly sensitive to chemical action; and, secondly, because, being an article of manufacture, it can be obtained more readily and in larger quantities than iron borings, which may be classed as waste products incident to other manufactures and of irregular production.

Having the metallic iron specified in either as sponge or an admixture of sponge and borings, I sprinkle it with a small quantity of aqua-ammonia, or equivalent chemical, which will induce oxidation of the metal, and allow the mass to rest for from six to twelve hours, stirring it from time to time, if the same becomes necessary, until the metal is more or less thoroughly oxidized.

I next take the lime (or protoxide of calcium) and slake the same to obtain the hydrate of lime, and from a portion of the hydrate of lime I form a strong lime-water in the well-known manner.

The oxidized iron and hydrate of lime are then thoroughly mixed with sawdust or its equivalent—that is, an absorbent substance which will increase the bulk and porosity of the mass—in or about the following proportions, (varied more or less at will:) iron, (oxidized,) one (1) part; lime, (hydrated,) three (3) parts; sawdust, eight (8) parts; and the mass is then saturated with the strong lime-water.

The above-described compound is readily manufactured, is very efficient in the removal of sulphur and ammonia from gas, and does not become foul speedily or require to be soon removed from the purifier, as is the case with most of those at present in use.

Having thus described the nature and advantages of my invention, what I claim, and desire to secure by Letters Patent, is—

A gas-purifying compound containing the following substances in admixture: iron sponge alone or mixed with iron borings and oxidized, substantially as specified, hydrate of lime, and sawdust, in substantially the proportions specified, the whole saturated with lime-water, substantially as and for the purpose specified.

In testimony whereof I, the said JOHN STORER CONNELLY, have hereunto set my hand.

JOHN STORER CONNELLY.

Witnesses:
F. W. RITTER, Jr.,
A. C. JOHNSTON.